July 8, 1941.　　　J. E. MOORE　　　2,248,376
CONVEYER SYSTEM
Filed April 1, 1940　　　3 Sheets-Sheet 1
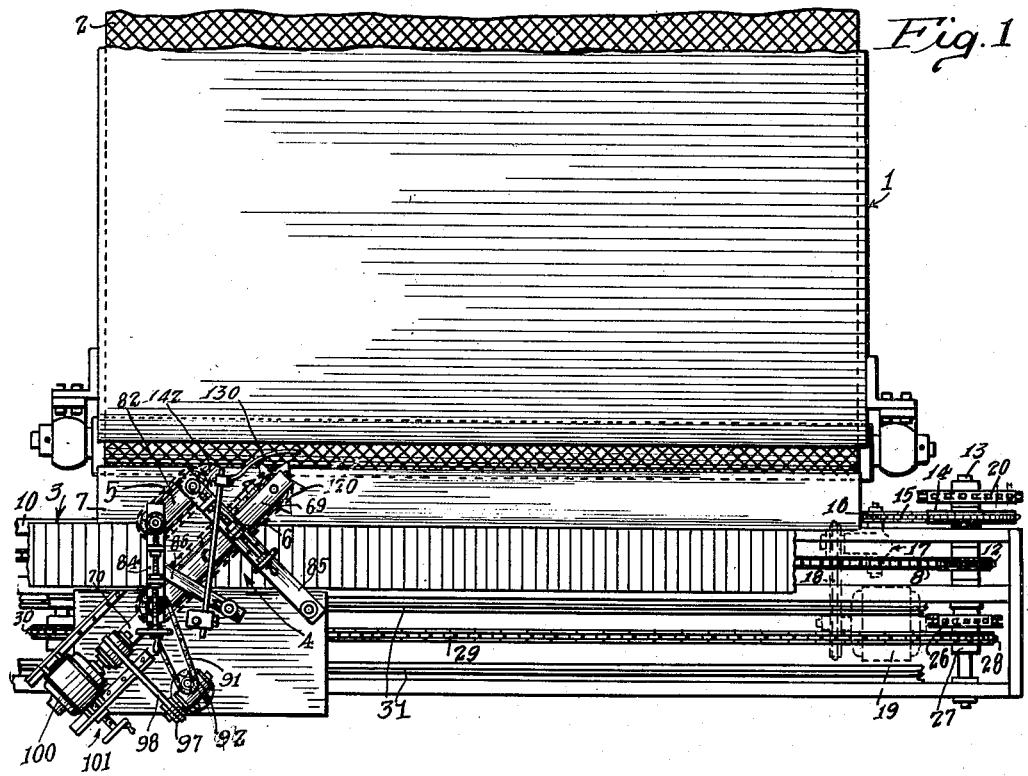
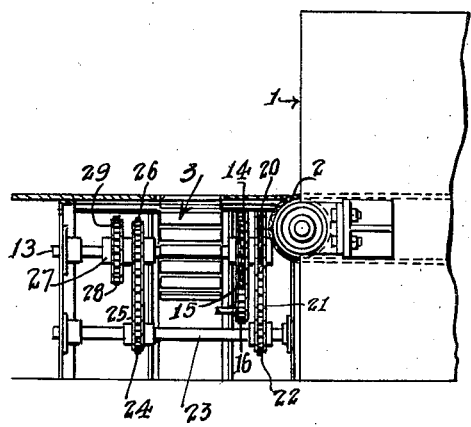
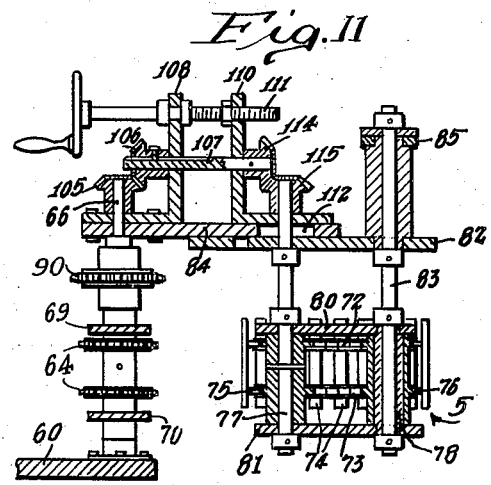
Inventor
James E. Moore
By Lyon & Lyon
Attorneys July 8, 1941.  J. E. MOORE  2,248,376
CONVEYER SYSTEM
Filed April 1, 1940  3 Sheets-Sheet 2
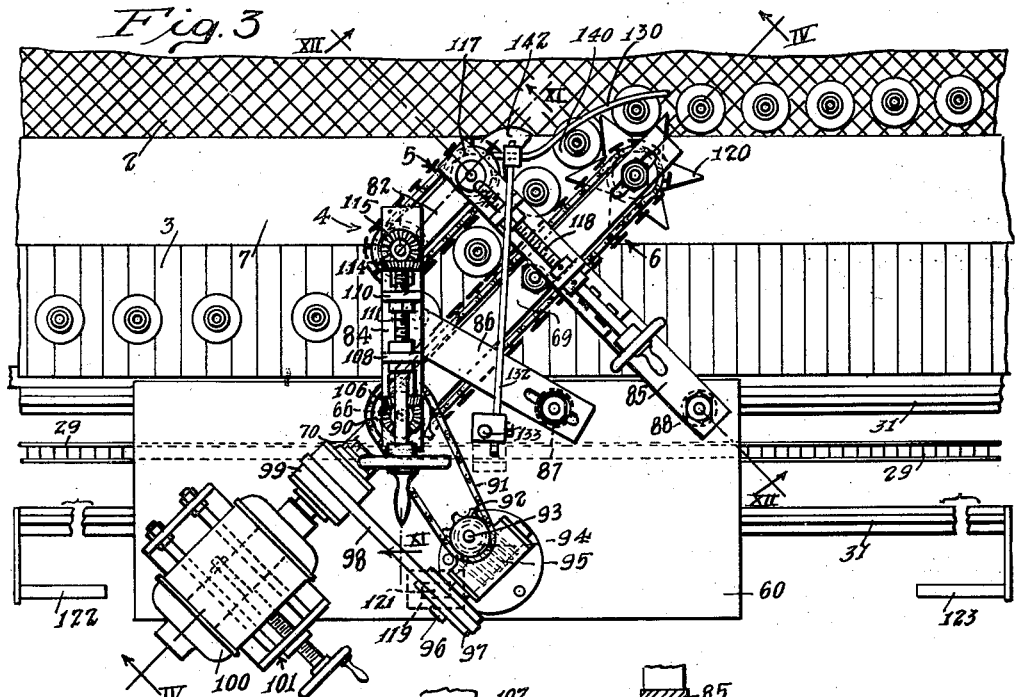
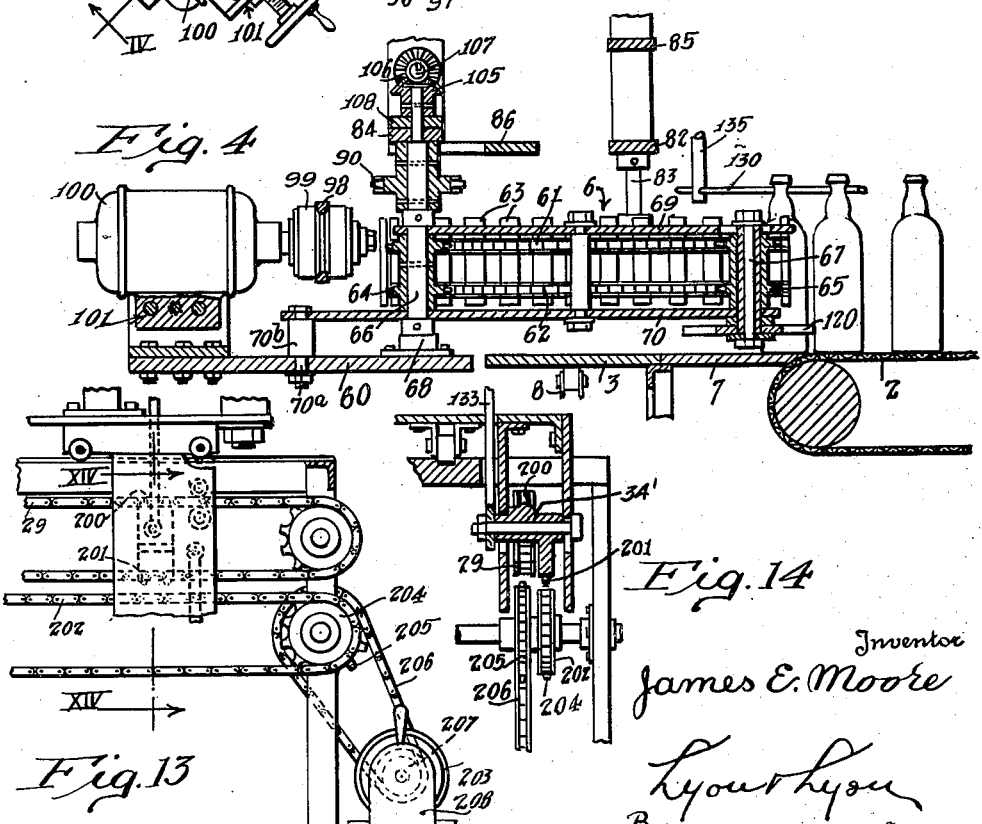
Inventor
James E. Moore
By Lyon & Lyon
Attorneys July 8, 1941.          J. E. MOORE          2,248,376
CONVEYER SYSTEM
Filed April 1, 1940          3 Sheets-Sheet 3
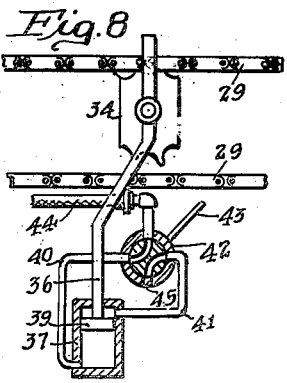
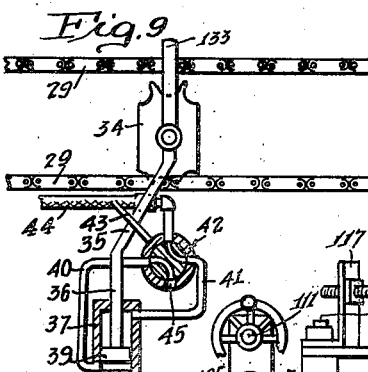
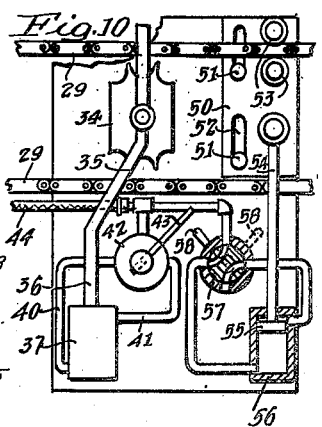
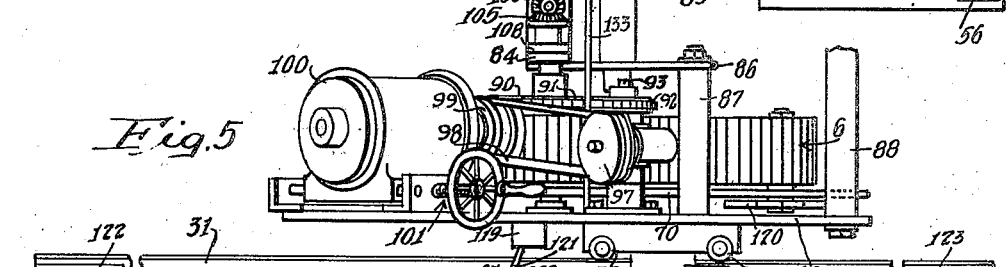

Patented July 8, 1941

2,248,376

UNITED STATES PATENT OFFICE 2,248,376

CONVEYER SYSTEM

James E. Moore, Los Angeles, Calif., assignor to Maywood Glass Co., Maywood, Calif., a corporation of California Application April 1, 1940, Serial No. 327,105

7 Claims. (Cl. 198—31)

This invention relates to conveyer systems employing moving belts, and the like, and is particularly useful for transferring articles from single file arrangement on one conveyer into multiple file arrangement on a second conveyer.

The invention is especially useful in bottle factories for automatically delivering bottles to a lehr.

As is well known in making glass bottles, the bottles are molded from the glass while the latter is in hot and plastic condition, and to avoid strains in the glass, the bottles must be cooled relatively slowly. Such slow cooling is effected by moving the bottles very slowly through an annealing oven or lehr, which lehr is of substantial length and is so heated and insulated that the temperature varies gradually from a relatively high value at the entrance end to substantially the room temperature at the discharge end.

It is common practice to convey the bottles through the lehr by means of a continuous belt extending the full length of the lehr and driving the belt at such a slow speed that the necessary slow cooling time will be consumed during travel of the belt from the entrance end to the discharge end of the lehr.

Despite the fact that lehrs are made relatively long, sometimes having a length of 50 feet or more, the belts must travel at an extremely slow speed in order to maintain the bottles in the lehr the time necessary to properly cool them (usually from two to three hours). In view of this slow speed of travel of the lehr belt, the belt must be of substantial width if it is to have sufficient capacity to handle the output of a modern bottle molding machine. It is not uncommon to employ lehr belts having a width of 8 feet and capable of accommodating 24 or more bottles (depending, of course, on their size) in transverse rows extending from edge to edge of the belt.

Heretofore it has been the practice to convey the bottles from the molding machine to the lehr manually, an operator handling the heated bottles with a suitable long-handled tool. This method of feeding the bottles to the lehr is objectionable, not only because of the labor cost but because it increases breakage and exposes the bottles to sudden variations in temperature during their transfer from the molding machine to the lehr.

It is old in the art to convey bottles or other articles away from a molding machine in single file on a chain conveyer belt, moving at a substantial speed sufficient to take the bottles away from the machine as fast as they are produced. However, to the best of my knowledge there has heretofore been no satisfactory known way of transferring bottles or the like from single file on a relatively rapidly moving conveyer belt into multiple file arrangement on a slower moving lehr belt.

An object of the present invention is to provide a simple and reliable apparatus for transferring articles from a single file rapidly moving conveyer onto a slowly moving wide conveyer in multiple row arrangement thereon.

A more specific object of the invention is to provide apparatus for shifting articles in one predetermined longitudinally spaced relation on a single file conveyer onto a wide slowly moving conveyer in multiple file with a predetermined lateral spacing between the files and with a predetermined desired longitudinal spacing between the articles in each file.

Various other more specific objects and features of the invention will become apparent from the description to follow of a specific embodiment thereof.

In a specific form, my invention comprises the combination of a wide, slowly moving conveyer, and a narrow, rapidly moving conveyer running past the input end of the wide conveyer, with a transfer mechanism arranged to reciprocate back and forth in a path parallel to the narrow conveyer and adapted to carry objects from the narrow conveyer to the wide conveyer during its movement in reverse direction to the movement of the narrow conveyer. The action is such that the narrow conveyer carries a single row of objects into juxtaposed relation to the end of the wide conveyer, whereupon the transfer mechanism shifts the objects laterally onto the wide conveyer in a transverse row thereon, after which the transfer mechanism advances with the narrow conveyer until the latter has brought another row of articles in juxtaposed relation to the input end of the wide conveyer, whereupon the operation is repeated.

A particular embodiment of the invention will now be described in detail, with reference to the drawings, in which Fig. 1 is a plan view of the main portion of a system in accordance with my invention;

Fig. 2 is a detail elevation view, looking at the right end of Fig. 1;

Fig. 3 is an enlarged detail plan view of a portion of the apparatus shown in Fig. 1;

Fig. 4 is a detail elevation view, partly in section, the view being taken substantially in the plane IV—IV of Fig. 3;

Fig. 5 is a front elevation view of the apparatus shown in Fig. 3;

Fig. 6 is a detail plan view of a portion of a conveyer employed in the system;

Fig. 7 is a sectional view, taken substantially in the plane VII—VII of Fig. 6;

Figs. 8, 9 and 10 are detail elevation views illustrating the operation of the carriage-shifting mechanism in the apparatus;

Fig. 11 is a vertical section, taken substantially in the plane XI—XI of Figs. 1 and 3;

Fig. 12 is a vertical section, taken substantially in the plane XII—XII of Fig. 3;

Fig. 13 is a detail elevation view, similar to the views of Figs. 8, 9 and 10, but showing an alternative construction for moving the carriage at different speeds when traveling in different directions; and Fig. 14 is a vertical sectional view, taken substantially in the plane XIV—XIV of Fig. 13.

Referring first to the plan view of Fig. 1, there is depicted the front end of a lehr 1 having a slowly moving conveyer belt 2, the upper side of which continually moves from the front of the lehr (the lower end in Fig. 1), to the rear to carry hot glassware through the lehr and gradually cool it. Positioned in front of the lehr 1 is a narrow conveyer 3 adapted to be moved continually from left to right at a speed substantially greater than the speed of the lehr belt 2. It will be understood that the belt 3 extends from a suitable source of supply of articles to be fed into the lehr 1, the source usually being a bottle molding machine. Therefore a single file of objects (hereinafter referred to as "bottles" for convenience) is advanced by the conveyer 3 until the leading bottle is adjacent the right edge of the lehr belt 2. Thereupon a transfer mechanism 4 comes into action to shift the row of bottles on the conveyer 3 substantially sidewise onto the front end of the lehr belt 2. The apparatus 4 reciprocates back and forth parallel to the conveyer 3, moving first to the right at the same speed as the conveyer 3, while a row of bottles is being advanced by the conveyer 3 into position juxtaposed to the lehr belt 2 and then reversing its direction to shift the bottles onto the lehr belt. The essential shifting elements of the apparatus 4 consist of a pair of belts 5 and 6, respectively, which engage the sides of bottles on the conveyer 3 and carry them laterally onto the lehr belt. An apron 7 is provided to fill the gap between the edge of the conveyer belt 3 and the lehr belt 2, all three of these elements being at the same level.

The conveyer belt 3 preferably is constructed as shown in Figs. 6 and 7, and comprises a chain 8 having a flat supporting plate 9 secured to each link of the chain so that the upper faces of the plates 9 form a nearly continuous level surface. The plates 9 may be constructed of some material, such as asbestos, of poor heat conductivity, although this is not essential. The upper half of the chain 8 is supported in horizontal position by a track 10, upon which the chain 8 slides. The conveyer 3 may be driven at a suitable speed by a sprocket 12 (Fig. 1) in engagement with the chain 8. This sprocket 12 is driven through its supporting shaft 13 by a sprocket 14 which is connected by a chain 15 to a driving sprocket 16 on a speed-reducing mechanism 17 which is in turn driven through a belt 18 from an electric motor 19. The shaft 13 also carries a sprocket 20 which is coupled (Fig. 2) by a chain 21 to a sprocket 22 on a countershaft 23. Countershaft 23 also carries a sprocket 24 which is coupled by a chain 25 to a sprocket 26 on a sleeve 27 which is freely rotatable on shaft 13. This sleeve 27 in turn drives a sprocket 28 carrying a chain 29 (Fig. 1) which functions to reciprocate the apparatus 4 back and forth in front of the lehr belt 2.

As shown in Fig. 5, the chain 29 is supported at the right end by the driving sprocket 28 and is supported at its left end by an idler sprocket 30. As is clearly apparent from Fig. 2, the upper side of the sprocket wheel 28, and therefore the upper run of the chain 29, is below the level of the conveyer 3, and the sprocket 12, driving the conveyer 3 is of larger diameter than the coaxial sprocket 28 driving chain 29. It is because of the fact that the chain 29 is to be driven at the same linear speed as the conveyer 3 that the sprocket 26 is driven through the two chains 21 and 25, and the sprockets 22 and 24, instead of being driven directly from shaft 13. In other words, in order for the chain 29 to have the same linear speed as the conveyer 3, the sprocket 28 must travel faster than the sprocket 12 because of the smaller diameter of sprocket 28. However, by mounting the sleeve 27 for rotation independently of the shaft 13, and properly choosing the relative diameters of the sprockets 20, 22, 24 and 26, the sprockets 28 can be driven at the proper speed to move the chain 29 at the same linear speed as the conveyer 3.

The apparatus 4 (Fig. 1) is supported by wheels riding on tracks 31, the wheels being shown in Fig. 5 at 32. In order to reciprocate the apparatus 4, means is provided for alternately connecting it to the upper and lower runs, respectively, of the chain 29. Thus referring to Fig. 5, there is provided on the apparatus 4, and extending downwardly therefrom, a bracket 33 which extends past the upper and lower runs of the chain 29 and slidably supports, for vertical movement thereon, a non-rotatable sprocket 34 which is adapted to engage either the upper or lower run of the chain 29, in driven relation therewith. As shown in Fig. 5, the sprocket 34 is in engagement with the upper run of chain 29 so that the apparatus 4 is moving rightward with the conveyer 3. The sprocket 34 is adapted to be shifted automatically by a hydraulic mechanism. Thus the sprocket 34 is connected by a bent rod 35 to the piston rod 36 of a hydraulic cylinder 37 mounted on the lower end of the bracket 33. Within the cylinder 37 (Fig. 8) the rod 36 connects to a piston 39. Pressure fluid is adapted to be supplied to the lower end of cylinder 37 through a pipe 40 and to the upper end through a pipe 41, from a control valve 42 having an actuating handle 43. As shown in Fig. 8, the handle 43 of valve 42 is in position to connect the lower end of cylinder 37 to a pressure supply line 44 (which may be an air line), and connect the upper end of the cylinder to an exhaust port 45, so that the sprocket 34 is held in its upper position. However, as the apparatus 4 approaches the rightmost limit of its travel, the handle 43 is intercepted by a stationary finger 46 (Fig. 5) which shifts the handle 43 from the full line position of Fig. 5 to the dotted line position.

Referring to Fig. 9, the valve 42 now connects the upper end of cylinder 37 to the pressure fluid supply line 44 and connects the lower end of the cylinder to the exhaust port so that the sprocket 34 is moved downward into engagement with the lower run of chain 29, thereby carrying the apparatus 4 leftward.

The leftward motion of apparatus 4 continues until it approaches the leftmost limit of its travel when the valve 43 is again intercepted by a stationary finger 48 (Fig. 5) which restores the handle 43 to the full line position of Fig. 5 and again connects the sprocket 29 with the upper run of the chain to move the apparatus 4 rightward.

The apparatus 4 may be stopped without stopping the chain 29 by completely disconnecting the sprocket 34 from either the upper or lower run of the chain. To this end a shiftable guide 50 (Fig. 10), for the upper run of the chain 29, is provided. Thus the guide 50 is guided for vertical movement on the bracket 33 by studs 51 thereon extending through slots 52 in the guide 50. Guide 50 carries a pair of rollers 53 which contain the upper run of the chain 29 therebetween. Guide 50 is connected by a piston rod 54 to a piston 55 in a second hydraulic cylinder 56, which is controlled through a valve 57 by pressure fluid from the line 44. Under normal conditions the handle 58 of the valve 57 is in the dotted line position of Fig. 10 in which pressure fluid is applied to the upper end of cylinder 56, to hold the guide member 50 in lower position, in which the rollers 53 maintain the upper run of chain 29 in position to engage the stationary sprocket 34 when the latter is in its upper position (as shown in Fig. 8). However, when the handle 58 of valve 57 is moved into the full line position of Fig. 10 pressure fluid is admitted to the lower end of cylinder 56 to move the guide member 50 upward, in which position the rollers 53 support the upper run of the chain 29 clear of the sprocket 34.

The apparatus 4 for laterally shifting the bottles from the conveyer 3 to the lehr belt 2, will now be described with reference to Figs. 3, 4, 5, 11 and 12. Thus it includes a table 60 supported by the wheels 32 running on the track 31, which table supports the entire apparatus 4, the most important elements of which are the shifter belts 5 and 6, respectively, which function to engage opposite sides of the bottles and carry them laterally from the conveyer 3 across the apron 7 onto the lehr belt 2.

The long shifter belt 6 comprises upper and lower chains (Fig. 4) 61 and 62, respectively, which support vertical cleats 63 constituting the bottle-engaging elements. Chains 61 and 62 are supported at opposite ends by sprockets 64 and 65, respectively, supported on shafts 66 and 67, respectively.

The sprocket 64 is pinned to shaft 66 for rotation therewith and the shaft is rotatably supported at its lower end in a bearing 68 on the table 60.

The shaft 67 which rotatably supports the sprocket 65 is hollow and is clamped to an upper arm 69 and extends through an aperture provided therefor in a lower arm 70. Both arms 69 and 70 are supported at their left ends (Fig. 4) on the shaft 66. The lower arm 70 is also extended and anchored rigidly to the table 60 by bolts 70a and a filler block 70b.

The short shifter belt 5 (Fig. 3) is similar in construction to the belt 6, including an upper chain 72 (Fig. 11), a lower chain 73, and vertical bottle-contacting elements 74. The chains 72 and 73 are supported at opposite ends by sprockets 75 and 76, respectively, mounted on shafts 77 and 78, respectively. These shafts 77 and 78 are maintained in proper relative spaced apart position by an upper plate 80 and a lower plate 81. Shaft 77 extends upwardly above the plate 80 and through a journal provided therefor in a supporting plate 82. The shaft 78 is hollow and is supported on a fixed shaft 83, which is likewise supported at its upper end by the plate 82.

Referring now to Fig. 3, the plate 82 is supported at its opposite ends by an arm 84 and an arm 85, respectively. The arm 84 extends to the shaft 66, (Fig. 11), the upper end of which shaft is journalled in plate 84. Arm 84 (Fig. 3) is further supported by an arm 86 secured thereto, which arm in turn is supported on the upper end of a pillar 87 anchored at its base to the table 60. The arm 85 is likewise supported on a pillar 88 anchored to the table 60.

Both the belts 5 and 6 are power driven from the shaft 66 through a sprocket 90 thereon (Fig. 4) which is coupled by a chain 91 (Fig. 3) to a sprocket 92 on a shaft 93 which has keyed thereto a wormwheel 94 driven by a worm 95 on a shaft 96. Shaft 96 in turn is driven by a pulley 97 coupled through a belt 98 to a variable diameter pulley 99 on the shaft of an electric motor 100. Motor 100 is adjustably mounted on the table 60 by an adjustable base 101, whereby the motor can be shifted to tighten or loosen the belt 98 and thereby vary the diameter of the variable diameter pulley 99. Shaft 66 is directly coupled to sprocket 64 to drive the long belt 6. Shaft 66 is coupled to the short belt 5 through a gear and shaft mechanism. Thus a bevel gear 105 is mounted on the upper end of shaft 66 (Fig. 4) which meshes with a bevel gear 106 keyed to a shaft 107 which is axially slidable within the gear 106.

Thus referring to Fig. 11, gear 106 is rotatably supported on the shaft 107 but is supported longitudinally in meshing relation with the gear 105 by a vertical wall member 108 in which the shaft 107 is journalled. This bracket 108 is rigidly mounted on the arm 84. The opposite end of the shaft 107 is rotatably supported in a bracket 110 which is slidable longitudinally on the arm 84 and can be adjusted to a desired longitudinal position and retained in that position by a screw 111. The arm 84 has a slot 112 through which the upper end of shaft 77 passes to permit relative longitudinal movement between the arm 84 and the shaft 77. The shaft 107 carries a bevel gear 114 on its opposite end, which meshes with a bevel gear 115 on the upper end of shaft 77 so that the latter is driven from the shaft 66.

It will be apparent from Fig. 3 and Fig. 11 that by adjusting the screw 111 the driving end of belt 5 can be shifted toward or away from the belt 6 to adjust the space between the belts to suit different sized bottles. A similar adjusting mechanism is provided for controlling the position of the outer end of the belt 5. Thus referring to Figs. 11 and 12, the arm 85 has a slot 116 through which the upper end of the shaft 83 extends into a journal provided in a bracket 117, which bracket is adjustable longitudinally along the arm 85 by a screw 118 so that by rotating the screw the shaft 83 can be shifted back and forth in the slot 116.

The belts 5 and 6 are driven only during reverse movement of the apparatus 4 relative to the conveyer 3. A switch mechanism is provided for stopping the motor 100 at the end of its leftward travel and starting it at the end of its rightward travel. To this end current is supplied to the motor 100 through a flexible cable (not shown) through a switch 119 (Fig. 5) mounted on the underside of table 60. Thus the switch is provided with a lever 121 adapted to be actuated by stationary, adjustable rods 122 and 123 on the machine frame. Just as the table completes its leftward movement, the rod 122 actuates the switch 119 to the right, to open the motor circuit so that the motor is stopped during rightward movement of the table 60. However as the table completes its rightward movement the rod 123 actuates the switch 119 to the left to again close the motor circuit so that the motor operates during leftward movement of the table 60. As shown in Figs. 3 and 5 the apparatus 4 is moving to the left against the stream of bottles on the conveyer 3 and the bottles are successively engaged between the belts 4 and 5 and carried thereby across the apron 7 onto the edge of the lehr belt 2, which is moving very slowly to carry the bottles away.

To insure proper spacing of the bottles as they are delivered onto the lehr belt 2, it is preferred to mount a star wheel 120 (Fig. 3) on the lower end of the shaft 67 (Fig. 4), this star wheel being freely rotatable and being rotated by the bottles as they move therepast, the points of the star wheel functioning to space the bottles as they leave the belt 6.

To eliminate any possibility of bottles being tipped away from the belt 6 and tumbling over onto the lehr belt 2, a guide arm 130 is curved as shown in Fig. 3 to follow the path of travel of the outer edges of the necks of the bottles as they move from the apron 7 onto the lehr belt 2. The arm 130 is secured to the lower end of a vertical post 135 (Fig. 4) which is secured at its upper end to a horizontal arm 132 (Fig. 3). The arm 132 is supported on a vertical standard 133 which extends vertically down through the table 60 (Fig. 5) and is mounted on the supporting frame of the sprocket 34 so that it moves vertically with the latter. The guide arm 130 is in a lowermost position in the path of the necks of the bottles, as shown in Fig. 4, during leftward movement of the apparatus 4, at which time the fixed sprocket 34 (Fig. 9) is in lowermost position. However, during rightward movement of the apparatus 4, the arm 130 is elevated with the fixed sprocket 34 so that it clears the necks of the bottles which were last deposited upon the lehr belt 2.

Since the conveyer 3 is moving to the right continuously, the bottles are positioned closer in a transverse row on the lehr belt 2 than they were positioned on the conveyer 3. They also tend to stack up between the belts 5 and 6. However, by virtue of the variable speed drive of the belts 5 and 6 obtained by the variable diameter pulley 99 on the motor 100, the speeds of the belts 5 and 6 can be adjusted to take care of different spacings of the bottles on the conveyer 3.

Because of the fact that the belts 5 and 6 are stopped during rightward movement of the apparatus 4, the bottles that were grasped between the belts at the time of reversal are simply carried along with the apparatus, the bottles sliding on the apron 7 or the conveyer 3. It may happen that at the time of reversal from leftward to rightward motion, a bottle is positioned as shown at 140 in Fig. 3 substantially half on the apron 7 and half on the lehr belt 2. In this event the bottle is carried rearwardly out of the path of the last bottle completely delivered to the lehr belt 2, by engagement against the bottle of a shoe 142 mounted on the lower end of the shaft 83 of the short belt 5. The reverse rotation of the star wheel 120 by engagement with the bottle last deposited on the lehr belt, aids in shifting the bottle 140 that was in transition from the apron 7 to the lehr belt, back onto the apron.

It has been indicated that the apparatus 4 should be driven rightward at the same speed as the conveyer 3. The reason for this is obvious. Thus if the apparatus were driven rightward at a speed greater than the conveyer 3, it would pull away from the bottles on conveyer 3 so that there would be a gap in the row of bottles delivered to the lehr belt 2. On the other hand, if the apparatus 4 moved to the right at a speed less than the speed of the conveyer belt 3, then the bottles on the latter would be crowded together by the apparatus 4.

The particular apparatus disclosed is of such construction as to drive the apparatus 4 leftward at the same speed that it is driven rightward, which is the speed of the conveyer belt 3. However, it is to be understood that it is not at all essential that the apparatus move leftward at the same speed that the conveyer 3 is moving rightward. For example, if the bottles are widely spaced along the conveyer 3 and it is desired to space them closely on the lehr belt 2, then the apparatus 4 should be driven leftward at a relatively slow speed to consume a substantial period of time during the leftward movement, thereby permitting the conveyer 3 to deliver to the apparatus 4 a relatively large number of bottles during the leftward stroke of the apparatus 4. On the other hand, if it is desired to space the bottles more widely apart on the lehr belt 2 relative to the spacing on the conveyer 3, then the apparatus should be driven rapidly to the left.

A construction that may be employed for moving the apparatus 4 to the left at a speed different from the speed of movement to the right, is illustrated in Figs. 13 and 14, in which elements corresponding to the elements in the preceding figures bear the same reference numerals. This apparatus differs essentially from that shown in Figs. 5, 8, 9 and 10 in that the sprocket 34 (Fig. 5) was designed to engage the upper run pulley 29 in upper position and the lower run of the same chain in lower position so that the carriage was driven in both directions by the chain 29, whereas in Figs. 13 and 14 a member 34' has dogs 200 adapted to engage the upper run of chain 29 in upper position but has dogs 201 laterally displaced from the dogs 200 and adapted when the member 34' is shifted into lower position (the shifting being performed exactly as described with reference to Figs. 5, 8, 9 and 10), they engage the upper run of a second chain 202 driven in the opposite direction to chain 29 by a separate motor 203. Thus the chain 202 is supported on a driving sprocket 204 and an idler sprocket (not shown) at the opposite end. Driving sprocket 204 is driven by a pulley 205 connected thereto which pulley is coupled by a belt 206 to a pulley 207 on a speed-reducing unit 208 built onto the motor 203. By adjusting the variable speed unit 208 the chain 202 can be driven at any desired speed to vary the spacing between the articles delivered to the lehr belt 2.

Although for the purpose of explaining the invention a specific and relatively crude embodiment of the invention has been described in detail, it is to be understood that the invention is not to be limited to the specific construction disclosed. Many variations from the structure disclosed will immediately appear to those skilled in the art, and the invention is to be limited only as set forth in the appended claims.

I claim:

1. In combination, a first conveyer for moving articles in tandem relation thereon, a second conveyer, an edge of which is parallel to a portion of said first conveyer, a carriage, and means for reciprocating it back and forth parallel to the direction of movement of said first conveyer, and lateral conveyer means on said carriage comprising a belt extending at an oblique angle across said first conveyer in the path of articles thereon, means for movably supporting said belt solely on said carriage, and means on said carriage for driving said belt, whereby articles intercepted by said belt are shifted laterally off said first conveyer by said belt with substantially no sliding movement between the articles and the belt.

2. In combination, a first conveyer for moving articles in tandem relation thereon, a second conveyer, an edge of which is parallel to a portion of said first conveyer, a carriage, and means for reciprocating it back and forth parallel to the direction of movement of said first conveyer, and lateral conveyer means on said carriage comprising a belt extending at an oblique angle across said first conveyer in the path of articles thereon, means for movably supporting said belt with respect to said carriage whereby articles intercepted by said belt are shifted laterally off said first conveyer by said belt with substantially no sliding movement between the articles and the belt, and an arm member on said carriage for movement therewith, said arm having a portion positioned in spaced relation to said belt and on the opposite side of articles in contact with the belt for engaging said articles and limiting displacement thereof away from said belt.

3. In combination, a first conveyer for moving articles in tandem relation thereon, a second conveyer, an edge of which is parallel to a portion of said first conveyer, a carriage, and means for reciprocating it back and forth parallel to the direction of movement of said first conveyer, and lateral conveyer means on said carriage comprising a belt extending at an oblique angle across said first conveyer in the path of articles thereon, means for movably supporting said belt with respect to said carriage whereby articles intercepted by said belt are shifted laterally off said first conveyer by said belt with substantially no sliding movement between the articles and the belt, and means adjacent the outer end of said belt for spacing articles leaving said belt from each other in the direction of travel of said carriage.

4. In combination, a first conveyer for moving articles in tandem relation thereon, a second conveyer, an edge of which is parallel to a portion of said first conveyer, a carriage, and means for reciprocating it back and forth parallel to the direction of movement of asid first conveyer, and lateral conveyer means on said carriage comprising a belt extending at an oblique angle across said first conveyer in the path of articles thereon, means for movably supporting said belt with respect to said carriage whereby articles intercepted by said belt are shifted laterally off said first conveyer by said belt with substantially no sliding movement between the articles and the belt, and a star wheel rotatably supported adjacent the outer end of said belt for interspacing articles delivered by said belt onto said second conveyer in the direction of travel of said carriage.

5. In combination, a first conveyer for moving articles in tandem relation thereon, a second conveyer, one edge of which is parallel and closely adjacent to a lateral edge of said first conveyer, a carriage, and means for reciprocating it back and forth in a path parallel to said lateral edge of said first conveyer, and lateral conveyer means on said carriage for successively engaging tandem articles on said first conveyer during reverse movement of said carriage and shifting said articles laterally onto said second conveyer in a row thereon that is parallel to said first conveyer, said lateral conveyer means comprising a pair of horizontally movable conveyer belts in parallel vertical planes so spaced relative to the dimensions of the articles to be handled as to frictionally engage opposite sides of the articles and carry the articles therebetween.

6. Apparatus as described in claim 5, in which said belts extend at an oblique angle to said first conveyer, and one of the belts is shorter than the other and terminates substantially at the edge of said first conveyer, the longer belt extending a substantial distance over said first conveyer to intercept articles thereon.

7. Apparatus as described in claim 1, with deflector means on said lateral conveyer means for recouping an article incompletely delivered to said second conveyer at the time of reversal of said carriage.

JAMES E. MOORE.